(12) United States Patent
Ren et al.

(10) Patent No.: US 9,561,976 B2
(45) Date of Patent: Feb. 7, 2017

(54) COUPLING BIOREACTOR AND METHOD FOR PURIFYING MALODOROUS GASES AND WASTEWATER

(71) Applicant: Nanjing University, Nanjing (CN)

(72) Inventors: Hongqiang Ren, Nanjing (CN); Ke Xu, Nanjing (CN); Lili Ding, Nanjing (CN); Jinju Geng, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 231 days.

(21) Appl. No.: 13/911,066

(22) Filed: Jun. 5, 2013

(65) Prior Publication Data
US 2014/0097137 A1   Apr. 10, 2014

(30) Foreign Application Priority Data

Oct. 10, 2012 (CN) .......................... 2012 1 0381436

(51) Int. Cl.
*C02F 3/02* (2006.01)
*C12M 1/04* (2006.01)
(Continued)

(52) U.S. Cl.
CPC .............. *C02F 3/085* (2013.01); *B01D 53/52* (2013.01); *B01D 53/58* (2013.01); *B01D 53/84* (2013.01);
(Continued)

(58) Field of Classification Search
CPC .............. B01D 53/85; B01D 2257/708; B01D 2257/304; B01D 2257/404; B01D 2257/90; B01D 53/508; C02F 3/10; Y10S 210/916; F23J 2215/20
(Continued)

(56) References Cited

U.S. PATENT DOCUMENTS 5,080,793 A * 1/1992 Urlings .......................... 210/603
5,674,433 A * 10/1997 Semmens et al. .............. 261/37
(Continued)

FOREIGN PATENT DOCUMENTS

JP    20003342928    * 12/2000  ............. B01D 53/38

OTHER PUBLICATIONS

Chung et al, "Biotreatment of Hydrogen Sulfide- and Ammonia-Containing Waste Gases by Fluidized Bed Bioreactor", Feb. 2001, Air & Waste Manage, Assoc. 51 pp. 163-172.*
(Continued)

*Primary Examiner* — Nam Nguyen
*Assistant Examiner* — Claire Norris
(74) *Attorney, Agent, or Firm* — Matthias Scholl, PC; Matthias Scholl

(57) ABSTRACT

A coupling bioreactor in the form of a tower type seal structure filled with a suspended carrier. A water inlet pipe, an air inlet pipe, and a first microporous aerator are arranged at the bottom of the coupling reactor. The water inlet pipe is connected to a water distributor. The air inlet pipe is connected to the first microporous aerator. A gas inlet pipe and a second microporous aerator are arranged at the middle part of the coupling bioreactor and are connected with each other. An annular overflow weir is arranged at the upper part of the coupling bioreactor and is connected to a water outlet pipe. A gas outlet pipe is arranged at the top of the coupling bioreactor. The ratio of the height to the diameter of the coupling bioreactor is between 3 and 10.

10 Claims, 1 Drawing Sheet

(51) Int. Cl.
*C02F 3/08* (2006.01)
*B01D 53/84* (2006.01)
*B01D 53/52* (2006.01)
*B01D 53/58* (2006.01)

(52) U.S. Cl.
CPC ..... *B01D 2251/11* (2013.01); *B01D 2257/306* (2013.01); *B01D 2257/90* (2013.01); *Y02W 10/15* (2015.05)

(58) Field of Classification Search
USPC ..... 210/150, 603, 615, 151; 435/266, 299.1, 435/289.1, 293.1, 254.2
See application file for complete search history.

(56) References Cited

U.S. PATENT DOCUMENTS

| | | | | |
|---|---|---|---|---|
| 5,985,649 | A | * | 11/1999 | Stensel et al. ................ 435/266 |
| 2012/0193287 | A1 | * | 8/2012 | Brouwer et al. ............. 210/618 |

OTHER PUBLICATIONS

English machine translation JP 2000342928, Kondo et al, Dec. 12, 2000, pp. 1-41.*

* cited by examiner

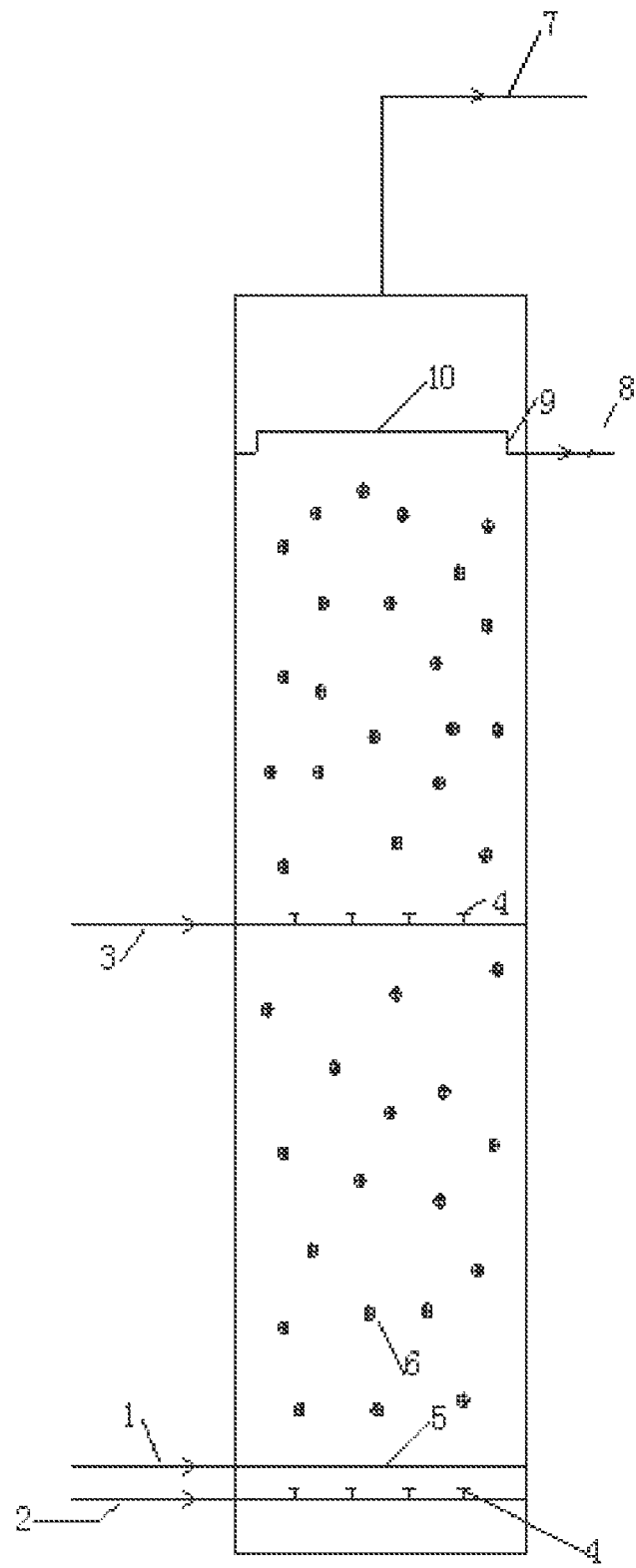

COUPLING BIOREACTOR AND METHOD FOR PURIFYING MALODOROUS GASES AND WASTEWATER

CROSS-REFERENCE TO RELATED APPLICATIONS

Pursuant to 35 U.S.C. §119 and the Paris Convention Treaty, this application claims the benefit of Chinese Patent Application No. 201210381436.0 filed Oct. 10, 2012, the contents of which are incorporated herein by reference.

BACKGROUND OF THE INVENTION

Field of the Invention

The invention relates to a biological device and a method for purifying malodorous gas and wastewater, and more particularly to a coupling bioreactor and a method for purifying malodorous gas and wastewater.

Description of the Related Art

Malodorous gas treatment is an important process in environmental pollution control. Two typical methods for treating malodorous gas include a physicochemical method and a biological method. The physicochemical method involves a complicate process and device, high operation cost, but a low efficiency. The biological method has a high efficiency of treatment, wide application, simple process, and low cost, thereby being a main technology in treating malodorous gas.

Typical biological treatments for malodorous gas include biotrickling filtration, biological filtration, bioscrubber, and biological aeration. The biotrickling filtration includes filling an inert filler into a biotrickling filter, that is, a reactor; inoculating microbes and controlling a proper condition for biofilm culturing on the inert filler; covering a surface of the inert filler by the biofilm; and meanwhile continuously spraying nutrient solution necessitated by metabolism of the microbes on the filler by using a circulation system. When the malodorous gas passes through the filler in the coupling bioreactor, pollutants are degraded by microbes. The biotrickling filtration has high load, and is highly controllable, so that it has been the most widely used biological treatment for malodorous gas.

However, problems, such as a large pressure fall, biomass accumulation, and blockage of the filler, exist in actual operation of the biotrickling filter. Furthermore, to ensure the normal growth of the microbes, nutrient solution is required to spray on the filler, during which a water film is easily formed on the surface of the filler and thus the water-insoluble substances are difficult to be utilized by the microbes. Thus, the selection and arrangement of the filler, the performance optimization, and the coupling bioreactor structure have been the focuses of the researchers in the field to improve the efficiency of the biotrickling filter.

SUMMARY OF THE INVENTION

The invention focuses on problems existing in the conventional biotrickling filters that a large pressure drop of the filler occurs during the operation of the biotrickling filter; biomass accumulation and blockage of the filler easily occurs in the bottom of the biotrickling filter, thereby requiring to be washed frequently. In view of the above-described problems, it is one objective of the invention to provide a coupling bioreactor and a method for purifying malodorous gas and wastewater.

The invention employs a biofilm having a long biological chain and a large biomass growing on a suspended carrier to treat malodorous gas and wastewater. The coupling bioreactor is aerated, and meanwhile the malodorous gas is introduced into the middle part of the coupling bioreactor via an aerator in the form of microbubbles, so that the suspended carrier moves in a continuous flow state in the middle part of the coupling bioreactor; pollutants in the wastewater and the malodorous gas fully contact with the biofilm growing on the suspended carrier during the flowing up process, and microbes degrade the pollutants of the wastewater and the malodorous gas and propagate. The flow state of the suspended carrier prevents problems of large pressure drop, biomass accumulation, and filler blockage, and improves the mass transfer. Matters in the waste water provide nutrient for the microbes, so that the nutrient solution is no need to add. The biofilm having a large biomass and a long biological chain attached to the filler is capable of completely degrading the pollutants in the malodorous gas and the wastewater.

To achieve the above objective, in accordance with one embodiment of the invention, there is provided a coupling bioreactor for purifying malodorous gas and wastewater in the form of a tower type seal structure. A gas inlet pipe and a second microporous aerator are arranged at a middle part of the coupling bioreactor and are connected with each other. The malodorous gas is introduced into the coupling bioreactor from a middle part of the coupling bioreactor. A water inlet pipe, an air inlet pipe, and a first microporous aerator are arranged at a bottom of the coupling reactor. The water inlet pipe is connected to a water distributor. The air inlet pipe is connected to the first microporous aerator. The wastewater and air are introduced into the coupling bioreactor from the bottom. An annular overflow weir is arranged at an upper part of the coupling bioreactor and is connected to a water outlet pipe for discharging water. A gas outlet pipe is arranged at a top of the coupling bioreactor for discharging treated gas. The coupling bioreactor is filled with a suspended carrier. The first microporous aerator used for air aeration and the water distributor used for water distribution are arranged at the bottom of the coupling bioreactor. The second microporous aerator used for malodorous gas aeration is arranged on the middle part of the coupling bioreactor.

In a class of this embodiment, a net cover is disposed on the annular overflow weir.

In a class of this embodiment, the suspended carrier is a polyethylene suspended carrier, and a ratio between a volume of the suspended carrier and a capacity of the coupling bioreactor is between 30% and 60%.

In a class of this embodiment, a density of the suspended carrier before a biofilm formation is between 0.97 and 0.98 g/cm$^3$; and a density of the suspended carrier after the biofilm formation is 1 g/cm$^3$.

In a class of this embodiment, the first microporous aerator and the second microporous aerator are disc type membrane microporous aerators or other kinds of membrane microporous aerators.

In a class of this embodiment, the malodorous gas and the air are introduced into the coupling bioreactor from the microporous aerators in the form of microbubbles having a diameter of 100 μm.

In a class of this embodiment, a dissolved oxygen concentration in the coupling bioreactor is between 2 and 6 mg/L. The suspended carrier is moves an irregular flow state by the drive of the water flow and the gas flow for facilitating the full contact of the gas and the water with the biofilm.

In a class of this embodiment, a ratio between a height and a diameter of the coupling bioreactor is between 3 and 10, which is finally determined by a concentration of pollutants in the malodorous gas. If the concentration of pollutants is less than 320 mg/m$^3$, the ratio is controlled between 3 and 6; and if the concentration of pollutants is between 320 and 620 mg/m$^3$, the ratio is controlled between 7 and 10.

Improvements of the invention are as follows: the wastewater and the malodorous gas are coupled inside the coupling bioreactor; aeration systems for the malodorous gas and the air are arranged on a middle part and a bottom of the coupling bioreactor, respectively; the suspended carrier adopted is an improved polyethylene suspended carrier, the density of the suspended carrier before the biofilm formation is between 0.97 and 0.98 g/cm$^3$, and a density of the suspended carrier after the biofilm formation is 1 g/cm$^3$; the ratio between the volume of the suspended carrier and the capacity of the coupling bioreactor is between 30% and 60%; and the suspended carrier moves in an irregular flow state in the coupling bioreactor by the drive of the water flow and the gas flow.

A method for purifying malodorous gas and wastewater using the coupling bioreactor comprises the following steps:
1) introducing the wastewater through the water inlet pipe and the water distributor into the coupling bioreactor;
2) introducing the air through the air inlet pipe and the first microporous aerator into the coupling bioreactor in the form of microbubbles; controlling an aeration rate for maintaining a dissolved oxygen concentration in the coupling bioreactor between 2 and 6 mg/L; and allowing the air and the wastewater to flow up synchronously;
3) introducing the malodorous gas through the gas inlet pipe and the second microporous aerator into the coupling bioreactor in the form of microbubbles; allowing the wastewater, the malodorous gas, and the air to flow up synchronously so that the suspended carrier moves randomly by the drive of water flow and air flow to facilitate the contact of organic pollutants in the malodorous gas and the wastewater and the oxygen in the air with a biofilm growing on the suspended carrier to degrade the organic pollutants by microbes; and
4) guiding the wastewater after treatment out of the coupling bioreactor through the annular overflow weir and the water outlet pipe; and releasing the gas out of the water and escaping the gas out of the coupling bioreactor via the gas outlet pipe.

In a class of this embodiment, the suspended carrier is a polyethylene suspended carrier; a density of the suspended carrier before a biofilm formation is between 0.97 and 0.98 g/cm$^3$; and a density of the suspended carrier after the biofilm formation is 1 g/cm$^3$.

In a class of this embodiment, the first microporous aerator in step 2) and the second microporous aerator in step 3) are disc type membrane microporous aerators; and the air and the gas is introduced into the coupling bioreactor in the form of microbubbles having a diameter of 100 μm.

Advantages of the invention are summarized as follows:
1) By controlling the ratio between the height and the diameter of the coupling bioreactor and arranging the water inlet pipe, the water distributor, the microporous aerators, and the gas inlet pipe, the malodorous gas and the wastewater are treated synchronously. Meanwhile, a nutrient solution is not necessitated, and a biofilm having a long biological chain is formed, thereby completely degrading pollutants in the malodorous gas and the wastewater.
2) The microporous aerators are arranged on both the bottom and the middle of the coupling bioreactor, and the suspended carrier moves in a continuous and irregular flow state, which facilitates the mass transfer between the water, the gas, and the biofilm, so that the microbes can completely degrade the pollutants in the malodorous gas and the wastewater. Problems like large pressure drop, biomass accumulation, and filler blockage are prevented.
3) The suspended carrier provides a proper environment to a dominant microflora for propagation. Abundant microfloras of different types improve the degradation ability of the filler and the treatment load. The treatment load can reach 240 g malodorous gas/m$^3$ filler•h, especially for polyethylene suspended carrier, the degrading ability of the filler and the treatment load are highly improved.

BRIEF DESCRIPTION OF THE DRAWINGS

FIG. 1 is a structure diagram of a coupling bioreactor of the invention.

In FIG. 1, the following reference numbers are used: 1. Water inlet pipe; 2. Air inlet pipe; 3. Gas inlet pipe; 4. Microporous aerator; 5. Water distributor; 6. Suspended carrier; 7. Gas outlet pipe; 8. Water outlet pipe; 9. Annular overflow weir; and 10. Net cover.

DETAILED DESCRIPTION OF THE EMBODIMENTS

To further illustrate the invention, experiments detailing a coupling bioreactor and a method for purifying malodorous gas and wastewater are described below. It should be noted that the following examples are intended to describe and not to limit the invention.

As shown in FIG. 1, a coupling bioreactor is in the form of a tower type seal structure. Malodorous gas is introduced into the coupling bioreactor from a middle part. Wastewater and air are introduced into the coupling bioreactor from a bottom. Treated water is discharged out of the coupling bioreactor from an upper part, and gas after treatment is discharged from a top. A suspended carrier, particularly a polyethylene suspended carrier, is filled inside the coupling bioreactor. A density of the suspended carrier before a biofilm formation is between 0.97 and 0.98 g/cm$^3$; and a density of the suspended carrier after the biofilm formation is 1 g/cm$^3$. A ratio between a volume of the suspended carrier and a capacity of the coupling bioreactor is between 30% and 60%. The coupling bioreactor is provided with a first microporous aerator 4 and a water distributor 5 at a bottom, and with a second microporous aerator 4 on a middle part. The first microporous aerator 4 and the second microporous aerator 4 are disc type membrane microporous aerators or other kinds of membrane microporous aerators. The malodorous gas and the air are introduced into the coupling bioreactor from the microporous aerators 4 in the form of microbubbles having a diameter of 100 μm. A dissolved oxygen concentration in the coupling bioreactor is between 2 and 6 mg/L. The suspended carrier moves in an irregular flow state by the drive of the water flow and the gas flow to facilitate the contact of the gas and the water with the biofilm. A ratio between the height and a diameter of the coupling bioreactor is between 3 and 10. The ratio between the height and the diameter of the coupling bioreactor is determined by a concentration of pollutants in the malodorous gas. If the pollutant concentration is less than 320 mg/m³, the ratio is controlled between 3 and 6. If the pollutant concentration is between 320 and 620 mg/m³, the ratio is controlled between 7 and 10.

The wastewater is introduced into the coupling bioreactor through the water inlet pipe 1 and the water distributor 5. The air is introduced into the coupling bioreactor in the form of microbubbles through the air inlet pipe 2 and the first microporous aerator 4. An air aeration rate is controlled for maintaining the dissolved oxygen concentration in the coupling bioreactor between 2 and 6 mg/L. The malodorous gas is introduced into the coupling bioreactor in the form of microbubbles through the gas inlet pipe 3 and the second microporous aerator 4. The wastewater and the malodorous gas flow up along with the air. The suspended carrier 6 inside the coupling bioreactor irregularly moves by the drive of the water flow and the gas flow. Organic pollutants in the malodorous gas and the wastewater and the oxygen in the air fully contact with the biofilm growing on the suspended carrier 6, so that the organic pollutants are degraded by microbes. The wastewater after treatment is discharged out of the coupling bioreactor through the annular overflow weir 9 into the water outlet pipe 8. A net cover is disposed on the annular overflow weir 9 for preventing the suspended carrier from flowing out of the coupling bioreactor along with the water. A filler load is determined by the gas volume to be treated and a concentration of the malodorous gas. When a peak concentration of the malodorous gas is less than 120 mg/m³, the filler load is controlled at 160 g malodorous gas/m³ filler•h; when the peak concentration of the malodorous gas exceeds 240 mg/m³, the filler load is controlled at 110 g malodorous gas/m³ filler•h; and when the peak concentration of the malodorous gas exceeds 650 mg/m³, pretreatment of the malodorous gas is needed. A wastewater load is required to meet the growth requirements of the microbes and is determined according to the water quality of the wastewater.

Example 1

A preliminary experiment is carried out in a lab. Malodorous gas comprises: ammonia, hydrogen sulfide, and air. An ammonia concentration is between 70 and 80 mg/m³, and a hydrogen sulfide concentration is between 60 and 70 mg/m³. The coupling bioreactor is made of organic glass and has an inner diameter of 160 mm, a ratio between the height and a diameter of 4, and a ratio between a volume of the suspended carrier and a capacity of the coupling bioreactor of 40%. The suspended carrier is a polyethylene suspended carrier. The density of the suspended carrier before a biofilm formation is between 0.97 and 0.98 g/cm³, and a density of the suspended carrier after the biofilm formation is 1 g/cm³. The microporous aerators are disc type membrane microporous aerators. The wastewater to be treated is originated from a municipal wastewater treatment plant and is introduced into the coupling bioreactor through a water inlet pipe and a water distributor arranged on a bottom of the coupling bioreactor. The air is introduced into the bottom of the coupling bioreactor in the form of microbubbles through the air inlet pipe and the first microporous aerator. An air aeration rate is controlled for maintaining the dissolved oxygen concentration in the coupling bioreactor between 3 and 4 mg/L. The air and the water flow up synchronously, and an air empty bed residence time is 9 s. The malodorous gas is introduced into the coupling bioreactor in the form of microbubbles through the gas inlet pipe and the second microporous aerator arranged on a middle part of the coupling bioreactor. The wastewater and the malodorous gas flow up along with the air. The suspended carrier inside the coupling bioreactor irregularly moves by the drive of the water flow and the gas flow. Organic pollutants in the malodorous gas and the wastewater and the oxygen in the air completely contact with the biofilm growing on the suspended carrier, so that the organic pollutants are degraded by microbes. A filler load is 150 g malodorous gas/m³ filler•h, a wastewater hydraulic retention time is 5 h, a filler load is 180 g COD/m³ filler•h. The wastewater after treatment is discharged from an annular overflow weir and into a water outlet pipe; the gas after treatment is released from the water and discharged out through a gas outlet pipe. A removal rate of the ammonia and hydrogen sulfide exceeds 97%, and a COD concentration in the effluent is less than 80 mg/L.

Example 2

A pilot-scale experiment is carried out in a wastewater treatment plant. A peak concentration of ammonia in malodorous gas is 20 mg/m³, and a peak concentration of hydrogen sulfide is 160 mg/m³. An inner diameter of the coupling bioreactor is 1.6 m, and a ratio between the height and the diameter of the coupling bioreactor is 3. The coupling bioreactor is a steel structure. A ratio between a volume of the suspended carrier and a capacity of the coupling bioreactor is 45%. The wastewater is an influent of a municipal wastewater treatment plant. The process of the treatment is the same as that in Example 1. A dissolved oxygen concentration in the coupling bioreactor is between 3 and 4 mg/L. A gas empty bed retention time is 11 s. A filler load is 130 g malodorous gas/m³ filler•h. A wastewater hydraulic retention time is 5 h. A filler load is 200 g COD/m³ filler•h. A removal rate of the ammonia and hydrogen sulfide during the treatment exceeds 98%, and a COD concentration in the effluent is less than 70 mg/L.

Example 3

A pilot-scale experiment is carried out in a wastewater treatment plant. A peak concentration of ammonia in malodorous gas is 166 mg/m³, and a peak concentration of hydrogen sulfide is 157 mg/m³. An inner diameter of the coupling bioreactor is 1.2 m, a ratio between the height and the diameter of the coupling bioreactor is 7, that is, the height of the coupling bioreactor is 8.4 m. The coupling bioreactor is a steel structure. A ratio between a volume of the suspended carrier and a capacity of the coupling bioreactor is 50%. The wastewater is an influent of a municipal wastewater treatment plant. The process of the treatment is the same as that in Example 1. A dissolved oxygen concentration in the coupling bioreactor is between 4 and 5 mg/L. A gas empty bed retention time is 24 s. A filler load is 100 g malodorous gas/m³ filler•h. A wastewater hydraulic retention time is 5 h. A filler load is 230 g COD/m³ filler•h. A removal rate of the ammonia and hydrogen sulfide during the treatment exceeds 98%, and a COD concentration in the effluent is less than 80 mg/L.

Example 4

A pilot-scale experiment is carried out in a wastewater treatment plant. A peak concentration of ammonia in malodorous gas is 94 mg/m³, and a peak concentration of hydrogen sulfide is 287 mg/m³. An inner diameter of the coupling bioreactor is 1.4 m, and a ratio between the height and the diameter of the coupling bioreactor is 9, that is, the height of the coupling bioreactor is 12.2 m. The coupling bioreactor is a steel structure. A ratio between a volume of the suspended carrier and a capacity of the coupling bioreactor is 60%. The wastewater is an influent of a municipal wastewater treatment plant. The process of the treatment is the same as that in Example 1. A dissolved oxygen concentration in the coupling bioreactor is between 5 and 6 mg/L. A gas empty bed retention time is 23 s. A filler load is 100 g malodorous gas/m³ filler•h. A wastewater hydraulic retention time is 5 h. A filler load is 220 g COD/m³ filler•h. A removal rate of the ammonia and hydrogen sulfide during the treatment exceeds 98%, and a COD concentration in the effluent is less than 80 mg/L.

Example 5

A pilot-scale experiment is carried out in a wastewater treatment plant. A peak concentration of ammonia in malodorous gas is 94 mg/m³, and a peak concentration of hydrogen sulfide is 287 mg/m³. An inner diameter of the coupling bioreactor is 1.4 m. A ratio between the height and the diameter of the coupling bioreactor is 10, that is, the height of the coupling bioreactor is 14 m. The coupling bioreactor is a steel structure. A ratio between a volume of the suspended carrier and a capacity of the coupling bioreactor is 30%. The wastewater is an influent of a municipal wastewater treatment plant. The process of the treatment is the same as that in Example 1. A dissolved oxygen concentration in the coupling bioreactor is between 2 and 3 mg/L. A gas empty bed retention time is 23 s. A filler load is 110 g malodorous gas/m³ filler•h. A wastewater hydraulic retention time is 5 h. A filler load is 210 g COD/m³ filler•h. A removal rate of the ammonia and hydrogen sulfide during the treatment exceeds 97%, and a COD concentration in the effluent is less than 80 mg/L.

Example 6

A pilot-scale experiment is carried out in a wastewater treatment plant. A peak concentration of ammonia in malodorous gas is 20 mg/m³, and a peak concentration of hydrogen sulfide is 60 mg/m³. An inner diameter of the coupling bioreactor is 1.6 m, and a ratio between the height and the diameter of the coupling bioreactor is 6. The coupling bioreactor is a steel structure. A ratio between a volume of the suspended carrier and a capacity of the coupling bioreactor is 50%. The wastewater is an influent of a municipal wastewater treatment plant. The process of the treatment is the same as that in Example 1. A dissolved oxygen concentration in the coupling bioreactor is between 3 and 4 mg/L. A gas empty bed retention time is 11 s. A filler load is 160 g malodorous gas/m³ filler·h. A wastewater hydraulic retention time is 5 h. A filler load is 200 g COD/m³ filler•h. A removal rate of the ammonia and hydrogen sulfide during the treatment exceeds 98%, and a COD concentration in the effluent is less than 80 mg/L.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A coupling bioreactor for treating malodorous gas and wastewater simultaneously, the coupling bioreactor being in the form of a tower type seal structure, and the coupling bioreactor comprising:

a) a water inlet pipe;
b) an air inlet pipe;
c) a gas inlet pipe;
d) a first and a second microporous aerator;
e) a water distributor;
f) a suspended carrier;
g) a gas outlet pipe;
h) a water outlet pipe;
i) an annular overflow weir, the annular overflow weir comprising an annular sidewall and an annular groove;
j) a biofilm; and
k) a net cover, the net cover being in a disc shape and comprising a circular edge;

wherein:
the coupling bioreactor is filled with the suspended carrier;
the biofilm is attached to the suspended carrier;
the suspended carrier is a polyethylene;
a ratio of a volume of the suspended carrier to a capacity of the coupling bioreactor is between 30% and 50%;
a ratio of a height to a diameter of the coupling bioreactor is between 3 and 10;
the water inlet pipe is adapted to receive wastewater;
the gas inlet pipe is adapted to receive malodorous gas;
the water inlet pipe, the air inlet pipe, and the first microporous aerator are arranged at a bottom of the coupling bioreactor; the water inlet pipe is connected to the water distributor; the air inlet pipe is connected to the first microporous aerator;
the gas inlet pipe and the second microporous aerator are arranged at a middle part of the coupling bioreactor and are connected with each other;
the annular overflow weir is arranged at an upper part of the coupling bioreactor and is connected to the water outlet pipe;
the circular edge is connected to a top edge of the annular sidewall;
the gas outlet pipe is arranged at a top of the coupling bioreactor; and
when in use, when the malodorous gas and wastewater are introduced into the coupling bioreactor, the suspended carrier moves randomly in the coupling bioreactor.

2. The coupling bioreactor of claim 1, wherein the first microporous aerator and the second microporous aerator are disc type membrane microporous aerators.

3. The coupling bioreactor of claim 2, wherein a density of the suspended carrier before a biofilm formation is between 0.97 and 0.98 g/cm³; and a density of the suspended carrier after the biofilm formation is 1 g/cm³.

4. The coupling bioreactor of claim 1, wherein when an initial concentration of odorous compounds in the malodorous gas is less than 320 mg/m³, the ratio of the height to the diameter of the coupling bioreactor is between 3 and 6; the odorous compounds comprise ammonia and hydrogen sulfide.

5. The coupling bioreactor of claim 1, wherein when an initial concentration of odorous compounds in the malodorous gas is between 320 and 620 mg/m³, the ratio of the height to the diameter of the coupling bioreactor is between 7 and 10; the odorous compounds comprise ammonia and hydrogen sulfide.

6. The coupling bioreactor of claim 1, wherein the ratio of the height to the diameter of the coupling bioreactor is dependent on an initial concentration of odorous compounds in the malodorous gas; the odorous compounds comprise ammonia and hydrogen sulfide.

7. A method for purifying malodorous gas and wastewater using the coupling bioreactor of claim 1, the method comprising:

1) introducing the wastewater through the water inlet pipe and the water distributor into the coupling bioreactor;
2) introducing air through the air inlet pipe and the first microporous aerator into the coupling bioreactor in the form of microbubbles; controlling an aeration rate for maintaining a dissolved oxygen concentration in the coupling bioreactor between 2 and 6 mg/L; and allowing the air and the wastewater to flow up synchronously;
3) introducing the malodorous gas through the gas inlet pipe and the second microporous aerator into the coupling bioreactor in the form of microbubbles; allowing the wastewater, the malodorous gas, and the air to flow up synchronously so that the suspended carrier moves randomly by the drive of water flow and air flow to facilitate the contact of organic pollutants in the malodorous gas and the wastewater and the oxygen in the air with the biofilm growing on the suspended carrier to degrade the organic pollutants by microbes; and
4) guiding the wastewater after treatment out of the coupling bioreactor through the annular overflow weir and the water outlet pipe; and discharging a gas released from the wastewater via the gas outlet pipe.

8. The method of claim 7, wherein a density of the suspended carrier before a biofilm formation is between 0.97 and 0.98 $g/cm^3$; and a density of the suspended carrier after the biofilm formation is 1 $g/cm^3$.

9. The method of claim 7, wherein the first microporous aerator and the second microporous aerator are disc type membrane microporous aerators; and the air and the malodorous gas are introduced into the coupling bioreactor in the form of microbubbles having a diameter of about 100 μm.

10. The method of claim 8, wherein the first microporous aerator and the second microporous aerator are disc type membrane microporous aerators; and the air and the malodorous gas are introduced into the coupling bioreactor in the form of microbubbles having a diameter of about 100 μm.

* * * * *